US012627416B2

(12) United States Patent
Mu

(10) Patent No.: US 12,627,416 B2
(45) Date of Patent: May 12, 2026

(54) HYBRID AUTOMATIC REPEAT REQUEST (HARQ) DELAY CONFIGURATION METHOD AND APPARATUS, AND STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 367 days.

(21) Appl. No.: 18/044,030

(22) PCT Filed: Sep. 7, 2020

(86) PCT No.: PCT/CN2020/113849
§ 371 (c)(1),
(2) Date: Mar. 3, 2023

(87) PCT Pub. No.: WO2022/047806
PCT Pub. Date: Mar. 10, 2022

(65) Prior Publication Data
US 2023/0336281 A1    Oct. 19, 2023

(51) Int. Cl.
*H04L 1/1829*          (2023.01)
(52) U.S. Cl.
CPC ................................. *H04L 1/1854* (2013.01)
(58) Field of Classification Search
None
See application file for complete search history.

(56) References Cited

U.S. PATENT DOCUMENTS

| | | | |
|---|---|---|---|
| 2015/0244485 A1* | 8/2015 | Nguyen | H04W 72/0446 |
| | | | 370/280 |
| 2019/0230647 A1* | 7/2019 | Yang | H04L 5/0051 |
| 2019/0363840 A1 | 11/2019 | Wang et al. | |
| 2020/0112400 A1 | 4/2020 | Lee et al. | |
| 2020/0274650 A1 | 8/2020 | Zhu | |
| 2021/0036810 A1* | 2/2021 | Mu | H04L 1/1854 |

(Continued)

FOREIGN PATENT DOCUMENTS

| | | |
|---|---|---|
| CN | 101247552 A | 8/2008 |
| CN | 107294646 A | 10/2017 |

(Continued)

OTHER PUBLICATIONS

ZTE, "Support additional PDSCH scheduling delay for introduction of 14-HARQ processes in DL for eMTC," 3GPP TSG RAN WG1 Meeting #102-e, R1-2005480, Aug. 28, 2020, pp. 1-4 (Year: 2020).*

(Continued)

*Primary Examiner* — Benjamin Lamont
(74) *Attorney, Agent, or Firm* — Finnegan, Henderson, Farabow, Garrett & Dunner, L.L.P.

(57) ABSTRACT

A method for configuring a hybrid automatic repeat request (HARQ) delay is applied to a network device, and includes: determining a first HARQ feedback delay value for a terminal of a first type, wherein the first HARQ feedback delay value belongs to a first HARQ feedback delay value set, and the first HARQ feedback delay value set is associated with the terminal of the first type and is different from a second HARQ feedback delay value set associated with a terminal of a second type.

6 Claims, 3 Drawing Sheets

Determining a first HARQ feedback delay value for a terminal of a first type

S11

(56)                References Cited

U.S. PATENT DOCUMENTS

| | | | | |
|---|---|---|---|---|
| 2021/0075555 A1* | 3/2021 | Zhu | ....................... | H04W 80/02 |
| 2021/0378003 A1* | 12/2021 | Yang | ..................... | H04L 1/1896 |
| 2021/0409159 A1* | 12/2021 | Zhu | ................... | H04W 72/1273 |
| 2022/0231820 A1* | 7/2022 | Zaki | ...................... | H04L 1/1896 |
| 2022/0400506 A1* | 12/2022 | Yang | ..................... | H04L 5/0055 |
| 2023/0144930 A1* | 5/2023 | Bhatoolaul | .......... | H04L 1/1812 370/328 |
| 2023/0269743 A1* | 8/2023 | Yan | ...................... | H04L 1/1854 370/329 |

FOREIGN PATENT DOCUMENTS

| | | |
|---|---|---|
| CN | 109121464 A | 1/2019 |
| CN | 109451798 A | 3/2019 |
| CN | 109496398 A | 3/2019 |
| CN | 109687942 A | 4/2019 |
| CN | 109688595 A | 4/2019 |
| CN | 110392994 A | 10/2019 |
| CN | 110809868 A | 2/2020 |
| CN | 111431671 A | 7/2020 |
| CN | 111435899 A | 7/2020 |
| CN | 112219367 A | 1/2021 |
| WO | WO 2019/205061 A1 | 10/2019 |
| WO | WO 2020/007086 A1 | 1/2020 |
| WO | WO 2020/133445 A1 | 7/2020 |

OTHER PUBLICATIONS

International Search Report of International Application No. PCT/CN2020/113849, issued Jun. 7, 2021, pages.

The First Office Action of Chinese Patent Application No. 202080002264.4, dated Nov. 18, 2022, 19 pages.

Qualcomm Incorporated, Enhancements to Scheduling and HARQ operation for NR-U, 3GPP TSG WG1 Meeting #95, R1-183415, Spokane, USA, Nov. 12-Nov. 16, 2018, 8 pages.

Nokia, Nokia Shanghai Bell, "Remaining details on NR-U HARQ scheduling and feedback", 3GPP TSG RAN WG1 #99, R1-1912261, Reno, USA, Nov. 18-22, 2019, 19 pages.

InterDigital Communications, "Multi-bit HARQ feedback for NR", 3GPP TSG RAN WG1 Meeting #88bis R1-1705441, Spokane, Washington, Apr. 3-7, 2017, 4 pages.

Sun, Shao-hui, et al., "Overview on the Progress of Design and Standardization of the Fifth Generation of Mobile Communications System", Journal of Beijing University of Posts and Telecommunications, Nov. 20, 2018, 19 pages.

* cited by examiner

Determining a first HARQ feedback delay value for a terminal of a first type

S11

Determining a first HARQ feedback delay value

S21

100

101

First Determining Module

200

201

HYBRID AUTOMATIC REPEAT REQUEST (HARQ) DELAY CONFIGURATION METHOD AND APPARATUS, AND STORAGE MEDIUM

CROSS-REFERENCE TO RELATED APPLICATIONS

The present application is a U.S. National Stage of International Application No. PCT/CN2020/113849 filed on Sep. 7, 2020, the entire contents of which are incorporated herein by reference.

TECHNICAL FIELD

The present disclosure relates to the technology field of wireless communication, and in particular, to a method and device for configuring a hybrid automatic repeat request (HARQ) delay and a storage medium.

BACKGROUND

In communication technology systems, the Internet of Things (IoT) is flourishing and brings many conveniences to human life and work. Machine Type Communication (MTC) is a typical representative of cellular IoT technology. At present, MTC has been widely used in various fields, for example, smart cities such as meter reading, smart agriculture such as temperature and humidity information collecting, and smart transportation such as bicycle sharing.

In MTC system-related technologies, when an MTC terminal is configured with scheduling enhancement "ce-SchedulingEnhancement" or hybrid automatic repeat request bundling "ce-HARQ-AckBundling", and the HARQ bundling function is activated in downlink control indicator (DCI), a flexible HARQ feedback delay is available.

SUMMARY

The present disclosure provides a method and device for configuring a hybrid automatic repeat request (HARQ) delay and a storage medium.

A first aspect of the present disclosure provides a method for configuring a hybrid automatic repeat request (HARQ) delay. The method is applied to a network device and includes:

determining a first HARQ feedback delay value for a terminal of a first type, wherein the first HARQ feedback delay value belongs to a first HARQ feedback delay value set, and the first HARQ feedback delay value set is associated with the terminal of the first type and is different from a second HARQ feedback delay value set associated with a terminal of a second type.

A second aspect of the present disclosure provides a method for configuring a hybrid automatic repeat request (HARQ) delay. The method is applied to a terminal and includes:

determining a first HARQ feedback delay value, wherein the first HARQ feedback delay value belongs to a first HARQ feedback delay value set, and the first HARQ feedback delay value set is associated with a terminal of a first type and is different from a second HARQ feedback delay value set associated with a terminal of a second type, and wherein the terminal belongs to the terminal of the first type.

A third aspect of the present disclosure provides a device for configuring a hybrid automatic repeat request (HARQ) delay. The device is applied to a network device and includes:

a first determining module, configured to determine a first HARQ feedback delay value for a terminal of a first type, wherein the first HARQ feedback delay value belongs to a first HARQ feedback delay value set, and the first HARQ feedback delay value set is associated with the terminal of the first type and is different from a second HARQ feedback delay value set associated with a terminal of a second type.

A fourth aspect of the present disclosure provides a device for configuring a hybrid automatic repeat request (HARQ) delay. The device is applied to a terminal and includes:

a second determining module, configured to determine a first HARQ feedback delay, wherein the first HARQ feedback delay value belongs to a first HARQ feedback delay value set, and the first HARQ feedback delay value set is associated with the terminal of the first type and is different from a second HARQ feedback delay value set associated with a terminal of a second type, and wherein the terminal belongs to the terminal of the first type.

A fifth aspect of the present disclosure provides a device for configuring a hybrid automatic repeat request (HARQ) delay, including:

a processor; and a memory, storing an executable instruction by the processor, wherein the processor is configured to execute the method for configuring the HARQ delay according to the first aspect or any embodiment of the first aspect.

A sixth aspect of the present disclosure provides a device for configuring a hybrid automatic repeat request (HARQ) delay, including:

a processor; and a memory, storing an executable instruction by the processor, wherein the processor is configured to execute the method for configuring the HARQ delay according to the second aspect or any embodiment of the second aspect.

A seventh aspect of the present disclosure provides a nonvolatile computer-readable storage medium having an instruction stored thereon that, when being executed by a processor of a mobile terminal, causes the mobile terminal to execute the method for configuring the HARQ delay according to the first aspect or any embodiment of the first aspect.

An eighth aspect of the present disclosure provides a nonvolatile computer-readable storage medium having an instruction stored thereon that, when being executed by a processor of a mobile terminal, causes the mobile terminal to execute the method for configuring the HARQ delay according to the second aspect or any embodiment of the second aspect.

It should be understood that the above general description and the following detailed description are exemplary and explanatory only and do not limit the present disclosure.

BRIEF DESCRIPTION OF THE DRAWINGS

The accompanying drawings herein, which are incorporated into and form a part of the specification, illustrate embodiments consistent with the present disclosure, and are used in conjunction with the specification to explain the principle of the present disclosure.

DETAILED DESCRIPTION

Figure 1:
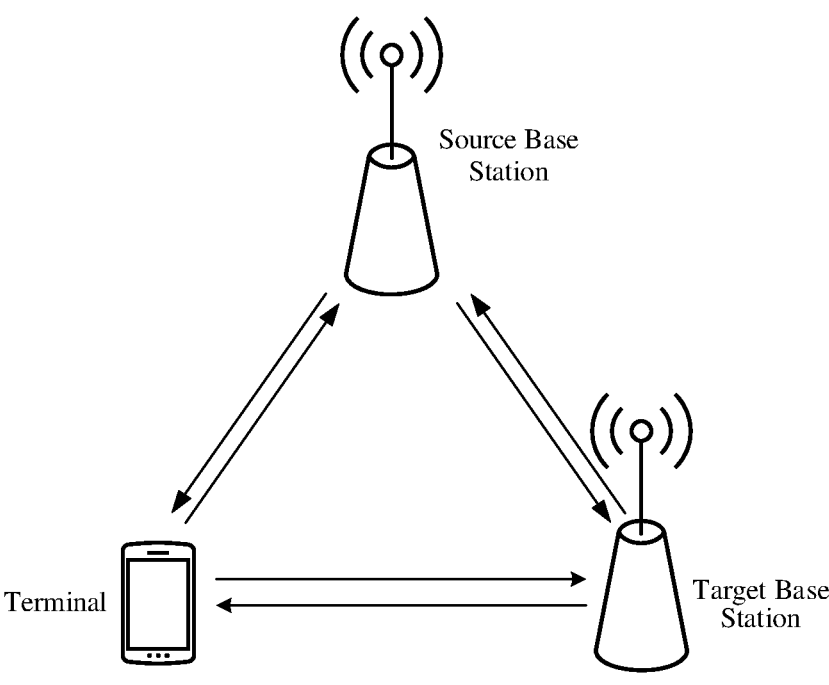
FIG. 1 is an architecture diagram of a communication system between a network device and a terminal according to an embodiment.

Exemplary embodiments will be described in detail herein, examples of which are illustrated in the accompanying drawings. When the following description is made with reference to the drawings, the same numerals in different drawings refer to the same or similar elements unless otherwise indicated. The implementations described in the embodiments below are not intended to represent all implementations of the embodiments of the present disclosure. Rather, they are merely examples of devices and methods according to some aspects of the embodiments of the present disclosure as recited in the appended claims.

In recent years, the Internet of Things (IoT) is flourishing and brings many conveniences to human life and work. Machine Type Communication (MTC) is a typical representative of cellular IoT technology. At present, MTC has been widely used in various fields, for example, smart cities such as meter reading, smart agriculture such as temperature and humidity information collecting, and smart transportation such as bicycle sharing.

However, as most of the application scenarios of MTC do not require high communication capacity, for example, in data collecting, and the cost of MTC terminal is low, the processing capacity of MTC terminal is correspondingly significantly reduced compared to other terminals. Moreover, due to the power-saving characteristics of MTC terminals, most MTC terminals are deployed in scenarios where the terminal is not easy to be charged or replaced with battery, for example, in the wild or basement.

In the related technology, the MTC terminal includes a Half Duplex Frequency Division Duplexing (HD-FDD) MTC terminal which is a half-duplex MTC terminal. Specifically, at a certain time, the HD-FDD MTC terminal can only transmit data or receive data, which does not support simultaneous transmission or reception of data.

HD-FDD MTC terminal-related capabilities are introduced into the next generation MTC system release. One of the capabilities supported by the HD-FDD MTC terminal is a capability of supporting up to 14 hybrid automatic repeat request (HARQ) processes. Therefore, when the HD-FDD MTC terminal supports a maximum of 14 HARQ processes, the conventional fixed HARQ feedback delay cannot meet the requirements and a flexible HARQ feedback delay is required.

In the related technology, when the MTC terminal is configured with scheduling enhancement "ce-SchedulingEnhancement" or hybrid automatic repeat request bundling "ce-HARQ-AckBundling", and a HARQ bundling function is activated in downlink control indicator (DCI), a flexible HARQ feedback delay is available. Referring to Table 1, Table 1 includes a corresponding HARQ delay element set 1 (i.e., column 2 of Table 1) when the terminal supports ce-SchedulingEnhancement, a corresponding HARQ delay element set 2 (i.e., column 3 of Table 1) when the terminal supports ce-SchedulingEnhancement or HARQ bundling, and a corresponding information field (i.e., column 1 of Table 1) in the downlink control indicator of each delay in the HARQ delay element sets 1 and 2.

TABLE 1

| Corresponding information filed of HARQ dynamic delay in DCI | Corresponding HARQ feedback delay value set 1 when terminal supports ce-SchedulingEnhancement | Corresponding HARQ feedback delay value set 2 when terminal supports ce-SchedulingEnhancement or HARQ bundling |
|---|---|---|
| 000 | 4 | 4 |
| 001 | 5 | 5 |
| 010 | 7 | 6 |
| 011 | 9 | 7 |
| 100 | 11 | 8 |
| 101 | 13 | 9 |
| 110 | 15 | 10 |
| 111 | 17 | 11 |

However, when the terminal needs to support a certain number of HARQ processes and to support the HARQ bundling, the HARQ feedback delay corresponding to the HARQ bundling may not meet delay requirements when the terminal supports the certain number of HARQ processes and the HARQ bundling.

In view of the technical problem involved in the above embodiment, the present disclosure provides a method for configuring a delay. FIG. 1 is a diagram of an architecture of a communication system between a network device and a terminal according to an embodiment. The method for determining the delay provided by the present disclosure may be applied in FIG. 1. As shown in FIG. 1, a network-side device sends indication information to configure a function and an HARQ feedback delay set for a terminal, and the terminal receives the indication information from the network-side device to determine the configured function and the HARQ feedback delay set. By configuring the HARQ feedback delay set, it is possible to use a corresponding dynamic delay element when the terminal supports a specified function, enabling the terminal to support more flexible delay elements.

It may be understood that the communication system including the network device and the terminal shown in FIG. 1 is illustrated schematically only, and that the wireless communication system may also include other network devices, for example, a core network device, a wireless relay device, a wireless backhaul device and the like, which are not shown in FIG. 1. The number of network devices and the number of terminals included in the wireless communication system are not limited in the embodiments of the present disclosure.

It may be further understood that the wireless communication system of the embodiments of the present disclosure is a network providing a wireless communication function. The wireless communication system may employ different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. Depending on the capacity, speed, delay and the like of the network, the network may be classified as a 2G (generation) network, a 3G network, a 4G network or a future evolution network such as a 5G network, which may also be referred to as a New Radio (NR) network. For ease of description, the wireless communication network may be referred to as a network simply.

Further, the network device involved in the present disclosure may also be referred to as a wireless access network device. The wireless access network device may be: a base station, an evolved node B (base station), a femtocell, an access point (AP) in a wireless fidelity (WIFI) system, a wireless relay node, a wireless backhaul node, a transmission point (TP), or a transmission and reception point (TP) and the like, it may also be a gNB in the NR system, or it may also be a component or part that makes up a base station. The network device may also be an in-vehicle device when the communication system is a vehicle-to-everything (V2X) communication system. It may be understood that in the embodiments of the present disclosure, the specific technology and the specific device form used for the network device are not limited.

Further, the terminal, which may also be referred to as a terminal device, user equipment (UE), mobile station (MS), mobile terminal (MT) and the like, involved in the present disclosure, is a device that provides voice and/or data connectivity to a user, for example, the terminal may be a handheld device, an in-vehicle device and the like with wireless connectivity. Examples of the terminal are mobile phone, pocket personal computer (PPC), palm computer, personal digital assistant (PDA), notebook computer, tablet computer, wearable device, in-vehicle device or the like. Further, the terminal device may also be an in-vehicle device when the communication system is a vehicle-to-everything (V2X) communication system. It may be understood that in the embodiments of the present disclosure, the specific technology and the specific device form used for the terminal are not limited.

In an embodiment of the present disclosure, a method for configuring a hybrid automatic repeat request (HARQ) delay is provided.

Figure 2:
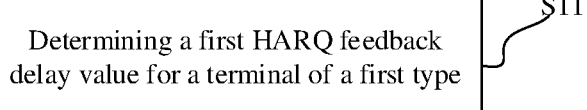
FIG. 2 is a flowchart of a method for configuring a hybrid automatic repeat request (HARQ) delay according to an embodiment.

FIG. 2 is a flowchart of a method for configuring an HARQ delay according to an embodiment. As shown in FIG. 2, the method for configuring the HARQ delay is applied in a network-side device and includes the following steps.

In step S11, a first HARQ feedback delay value is determined for a terminal of a first type.

The first HARQ feedback delay value belongs to a first HARQ feedback delay value set, and the first HARQ feedback delay value set is associated with the terminal of the first type and is different from a second HARQ feedback delay value set associated with a terminal of a second type.

By determining a first HARQ feedback delay value for a terminal of a first type, and thereby determining that the first HARQ feedback delay value belongs to a first HARQ feedback delay value set, and with that the first HARQ feedback delay value set is associated with the terminal of the first type, and that the first HARQ feedback delay value set is different from a second HARQ feedback delay value set associated with a terminal of a second type, the present disclosure determines a flexible HARQ feedback delay value for the terminal, which can enhance the performance of HARQ bundling and meet the HARQ feedback delay value requirement when the terminal supports both the HARQ bundling and the HARQ process.

In some embodiments of the present disclosure, the network-side device defines, according to a scheduling characteristic of an HARQ process, an HARQ feedback delay value set when configuring an HARQ bundling function for a terminal. For example, the network-side device defines, for the terminal of the first type, the first HARQ feedback delay value set associated with the terminal of the first type, and for the terminal of the second type, the second HARQ feedback delay value set associated with the terminal of the second type. Further, the first HARQ feedback delay value set defined is different from the second HARQ feedback delay value set associated with the terminal of the second type. The first and second HARQ feedback delay value sets defined may be defined as one HARQ feedback delay value set, then the first HARQ feedback delay value set is a subset or full set of the one HARQ feedback delay value set defined, and the second HARQ feedback delay value set is a subset or full set of the one HARQ feedback delay value set defined. In an embodiment, at least two HARQ feedback delay value sets are defined. For example, if two HARQ feedback delay value sets are defined, one of the HARQ feedback delay value sets is the first HARQ feedback delay value set associated with the terminal of the first type, and the other of the HARQ feedback delay value sets is the second HARQ feedback delay value set associated with the terminal of the second type. When it needs, according to the scheduling characteristic of the HARQ, to indicate a terminal one HARQ feedback delay value supported, the type of the terminal is determined and the HARQ feedback delay value set supported is notified to the terminal via third indication information. In an embodiment, the HARQ feedback delay value set associated with the type of the terminal is further determined according to the determined type of the terminal, so that the HARQ feedback delay value to be used by the terminal is determined according to the HARQ feedback delay value set associated with the type of the terminal, and first indication information may be sent to directly indicate the HARQ feedback delay value to be used by the terminal.

In an embodiment, if the determined type of the terminal is the terminal of the first type, the network-side device determines a first HARQ feedback delay value for the terminal of the first type according to the first HARQ feedback delay value set associated with the terminal of the first type.

In another embodiment, if the determined type of the terminal is the terminal of the first type and there is an HARQ feedback delay value supported by the terminal of the first type in the second HARQ feedback delay value set, the network-side device may also determine the first HARQ feedback delay value for the terminal of the first type according to the second HARQ feedback delay value set.

In some embodiments of the present disclosure, the first HARQ feedback delay value set includes at least one first HARQ feedback delay value, and the at least one first HARQ feedback delay value does not belong to the second HARQ feedback delay value set. In other words, if at least two HARQ feedback delay value sets are defined, there is at least one HARQ feedback delay value which belongs to the first HARQ feedback delay value set and does not belong to the second HARQ feedback delay value. In an embodiment, there is at least one HARQ feedback delay value which belongs to the second HARQ feedback delay value set and does not belong to the first HARQ feedback delay value.

In an embodiment, the terminal of the first type is a terminal supporting a first number of HARQ processes, and the terminal of the second type is a terminal not supporting the first number of HARQ processes.

In some embodiments of the present disclosure, the network-side device defines at least two HARQ feedback delay value sets according to a scheduling characteristic of the HARQ process for use when configuring the HARQ bundling function. In an embodiment of the present disclosure, the terminal supporting the first number of HARQ processes is referred to as the terminal of the first type, and the terminal not supporting the first number of HARQ processes is referred to as the terminal of the second type. Among the at least two HARQ feedback delay value sets defined, the first HARQ feedback delay value set is associated with the terminal of the first type, and the second HARQ feedback delay value set is associated with the terminal of the second type. In this case, the number of the first HARQ feedback delay values in the defined first HARQ feedback delay value set may be greater than the number of the second HARQ feedback delay values in the second HARQ feedback delay value set. For example, the defined first HARQ feedback delay value set includes 10 first HARQ feedback delay values having the range of 5 to 15, and the defined second HARQ feedback delay value set may include 8 second HARQ feedback delay values having the range of 4 to 11, which, of course, is illustrative and is not a limitation of the embodiments of the present disclosure.

In some embodiments, when defining the HARQ feedback delay values in the first and second HARQ feedback delay value sets, the HARQ feedback delay values in the first and second HARQ feedback delay value sets may also be filtered HARQ feedback delay values that may be supported by the terminal.

In some embodiments of the present disclosure, when one HARQ feedback delay value needs to be indicated for the terminal according to the scheduling characteristic of the HARQ process, the network side may first notify the terminal of the HARQ feedback delay value set to be used through indication information. Then, the network side indicates to the terminal the HARQ feedback delay value in the HARQ feedback delay value set via an information field included in a downlink control indicator. For example, if the determined type of terminal is the terminal of the first type, the network side first notifies the terminal of the first type of the HARQ feedback delay value set to be used in determining the HARQ feedback delay values by sending third indication information. Then, the network side sends first indication information via the downlink control indicator to notify the terminal of the first type of the HARQ feedback delay value to be used. The first indication information is used to indicate the first HARQ feedback delay value, and the first indication information includes a first information field for indicating the first HARQ feedback delay value in the HARQ feedback delay value set. In an embodiment, the first information field includes a bit corresponding to the first HARQ feedback delay value in the HARQ feedback delay value set. The terminal may determine, according to the bit, the first HARQ feedback delay value corresponding to the bit in the notified HARQ feedback delay value set.

In one way, when the terminal supports the first number of HARQ processes and supports the HARQ bundling function, the network-side device configures the HARQ bundling function for the terminal via high-level signaling. The high-level signaling may be for example radio resource control (RRC) signaling or media access control (MAC) signaling. In this case, the downlink control indicator (DCI) sent to the terminal may or may not include second indication information for activating the HARQ bundling function of the terminal. Regardless the DCI includes or does not include the second indication information for activating the HARQ bundling function of the terminal, the HARQ feedback delay value used by the terminal may be indicated by using an information field of 4 bits.

In another way, when the terminal supports the first number of HARQ processes and supports the HARQ bundling function, the network-side device configures the HARQ bundling function for the terminal by means of RRC signaling or MAC signaling. Second indication information may be included in the downlink control indicator (DCI) to indicate the terminal whether to activate the HARQ bundling function supported by the terminal or not. In an embodiment, if the network-side device determines to active the HARQ bundling function, the second indication information is sent to instruct the terminal to activate the HARQ bundling function. In this case, the first HARQ feedback delay value in the HARQ feedback delay value set used by the terminal may be indicated with 4 bits. In another embodiment, if the network-side device determines not to active the HARQ bundling function, the second indication information is not carried in the DCI, which indicates not to instruct the terminal to active the HARQ bundling function. In this case, 3 bits may be used to indicate the HARQ feedback delay value in the first HARQ feedback delay value set.

It may be understood that when defining the relationship between the bit and the HARQ feedback delay value, it is determined that the bit for indicating the HARQ feedback delay value to be used by the terminal is in a fixed one-to-one correspondence with the HARQ feedback delay value. For example, when the information field for indicating the HARQ feedback delay value is 3 bits, the HARQ feedback delay value corresponding to 000 may be 4, the HARQ feedback delay value corresponding to 001 may be 5, and the like. When the information field for indicating the HARQ feedback delay value is 4 bits, the HARQ feedback delay value corresponding to 0000 may be 4, the HARQ feedback delay value corresponding to 0001 may be 5, and the like. Of course, these are only examples and are not to limit the embodiments of the present disclosure. For different HARQ feedback delay value sets, there may be different mapping relationships between the bit value and the HARQ feedback delay value. These mapping relationships may be specified by protocol or may be pre-configured. The terminal may determine the mapping relationship between the bit value and the HARQ feedback delay value inherent in the used HARQ feedback delay value set by determining this HARQ feedback delay value set.

In some embodiments of the present disclosure, when the network-side device defines at least two HARQ feedback delay value sets, the first HARQ feedback delay value set and the second HARQ feedback delay value set defined have the same number of HARQ feedback delay values and different HARQ feedback delay values. Cases of different HARQ feedback delay values include at least one of the followings:

all of the HARQ feedback delay values in the first HARQ feedback delay value set being different from the HARQ feedback delay values in the second HARQ feedback delay value set; or part of the HARQ feedback delay values in the first HARQ feedback delay value set being different from the HARQ feedback delay values in the second HARQ feedback delay value set; or the range of the HARQ feedback delay values in the first HARQ feedback delay set being different from the range of the HARQ feedback delay value in the second HARQ feedback delay set.

For example, the first HARQ feedback delay set includes 8 first HARQ feedback delay values having the range of 4 to 11, and the second HARQ feedback delay set similarly includes 8 second HARQ feedback delay values having the range of 8 to 15. Of course, these are examples only, and are not to limit the embodiments of the present disclosure.

In some embodiments of the present disclosure, the network-side device notifies the terminal of the HARQ feedback delay value set to be used by sending third indication information. For example, the network-side device defines at least two HARQ feedback delay value sets and sends the third indication information to the terminal of the first type. The third indication information is used to indicate the terminal of the first type to use the first HARQ feedback delay value set or the second HARQ feedback delay value set. In another embodiment, since in the at least two HARQ feedback delay sets defined, the first HARQ feedback delay set is associated with the terminal of the first type and/or the second HARQ feedback delay set is associated with the terminal of the second type, when a target terminal is determined to be the terminal of the first type, it may directly indicate the HARQ feedback delay to be used to the terminal according to the first HARQ feedback delay set, and when the target terminal is determined to be the terminal of the second type, it may directly indicate the HARQ feedback delay value to be used to the terminal according to the second HARQ feedback delay value set.

In some embodiments of the present disclosure, the first number of HARQ processes involved in the above embodiments may be 14 HARQ processes. The first HARQ feedback delay value set may be a feedback delay value set supporting 14 HARQ processes.

In the following embodiments of the present disclosure, it will illustrate an example where the network defines at least two HARQ feedback delay value sets when configuring the HARQ bundling function for the terminal, in which the terminal supporting 14 HARQ processes is the terminal of the first type and the terminal not supporting 14 HARQ processes is the terminal of the second type.

In some embodiments of the present disclosure, the network-side device defines at least two HARQ feedback delay value sets when configuring HARQ bundling, in which the first HARQ feedback delay value set is associated with the terminal of the first type, and the second HARQ feedback delay value set is associated with the terminal of the second type. Further, the first HARQ feedback delay set is different from the second HARQ feedback delay set associated with the terminal of the second type.

When the network-side device needs to indicate the HARQ feedback delay value for the terminal according to the scheduling characteristic of HARQ, the network-side device first determines the type of the terminal, and determines the HARQ feedback delay value set to used by the terminal according to the type of the terminal.

In an embodiment of the present disclosure, for example, the determined type of terminal is the terminal of the first type. In an embodiment, the first HARQ feedback delay value is determined for the terminal of the first type according to the first HARQ feedback delay value set associated with the terminal of the first type. In another embodiment, if there is a HARQ feedback delay value supported by the terminal of the first type in the second HARQ feedback delay set, the network-side device may also determine the first HARQ feedback delay value for the terminal of the first type according to the second HARQ feedback delay set, in this case, third indication information needs to be sent to indicate the terminal to use the second HARQ feedback delay set.

It may be understood that the first HARQ feedback delay set includes at least one first HARQ feedback delay value and the at least one first HARQ feedback delay value does not belong to the second HARQ feedback delay set. In other words, if at least two HARQ feedback delay value sets are defined, there is at least one HARQ feedback delay value that belongs to the first HARQ feedback delay value set and does not belong to the second HARQ feedback delay value. In an embodiment, there is at least one HARQ feedback delay value that belongs to the second HARQ feedback delay value set and does not belong to the first HARQ feedback delay value. In an embodiment, the number of the first HARQ feedback delay values in the first HARQ feedback delay value set defined may be greater than the number of the second HARQ feedback time delay values in the second HARQ feedback delay value set. For example, the defined first HARQ feedback delay value set includes 10 first HARQ feedback delay values having the range of 5 to 15, and the defined second HARQ feedback delay value set may include 8 second HARQ feedback delay values having the range of 4 to 11, which, of course, is illustrative and is not a limitation of the embodiments of the present disclosure.

In an embodiment of the present disclosure, when defining the HARQ feedback delay values in the first and second HARQ feedback delay value sets, the HARQ feedback delay values in the first and second HARQ feedback delay value sets may also be filtered HARQ feedback delay values that may be supported by the terminal.

In an embodiment of the present disclosure, when the network-side device determines that the terminal supports 14 HARQ processes and supports the HARQ bundling function, and the network-side device configures the HARQ bundling function for the terminal via RRC signaling or MAC signaling, the network-side device may indicate the terminal to activate the HARQ bundling function via a downlink control indicator, and indicate the HARQ feedback delay value to be used for the terminal by sending the downlink control indicator. In an embodiment, the downlink control indicator may include an information field for indicating the HARQ feedback delay value to be used by the terminal, and the number of bits included in the information field may be determined based on any of the following:

determining to use the information field of 4 bits in the downlink control indicator to indicate the HARQ feedback delay value used by the terminal; or determining to activate the HARQ bundling function of the terminal, and then in response to determining to activate the HARQ bundling function, indicating, with 4 bits, the HARQ feedback delay value in the first HARQ feedback delay value set; and in response to determining not to activate the HARQ bundling function of, indicating, with 3 bits, the HARQ feedback delay value in the first HARQ feedback delay value set.

It may be understood that when defining the relationship between the bit and the HARQ feedback delay value, it is determined that the bit for indicating the HARQ feedback delay value to be used by the terminal is in a fixed one-to-one correspondence with the HARQ feedback delay value. For example, when the information field for indicating the HARQ feedback delay value is 3 bits, the HARQ feedback delay value corresponding to 000 may be 4, the HARQ feedback delay value corresponding to 001 may be 5, and the like. When the information field for indicating the HARQ feedback delay value is 4 bits, the HARQ feedback delay value corresponding to 0000 may be 4, the HARQ feedback delay value corresponding to 0001 may be 5, and the like. Of course, these are only examples and are not to limit the embodiments of the present disclosure. For different HARQ feedback delay value sets, there may be different mapping relationships between the bit value and the HARQ feedback delay value. These mapping relationships may be specified by protocol or may be pre-configured. The terminal may determine the mapping relationship between the bit value and the HARQ feedback delay value inherent in the used HARQ feedback delay value set by determining this HARQ feedback delay value set.

When the network-side device defines at least two HARQ feedback delay value sets, the first HARQ feedback delay value set and the second HARQ feedback delay value set defined have the same number of HARQ feedback delay values and different HARQ feedback delay values. Cases of the different HARQ feedback delay values include at least one of the followings:

all of the HARQ feedback delay values in the first HARQ feedback delay value set being different from the HARQ feedback delay values in the second HARQ feedback delay value set; or part of the HARQ feedback delay values in the first HARQ feedback delay value set being different from the HARQ feedback delay values in the second HARQ feedback delay value set; or the range of the HARQ feedback delay values in the first HARQ feedback delay set being different from the range of the HARQ feedback delay value in the second HARQ feedback delay set.

For example, the first HARQ feedback delay set includes 8 first HARQ feedback delay values having the range of 4 to 11, and the second HARQ feedback delay set similarly includes 8 second HARQ feedback delay values having the range of 8 to 15. Of course, these are examples only, and are not to limit the embodiments of the present disclosure.

Based on a similar concept, an embodiment of the present disclosure provides a method for configuring a hybrid automatic repeat request (HARQ) delay.

Figure 3:
FIG. 3 is a flowchart of another method for configuring an HARQ delay according to an embodiment.

FIG. 3 is a flowchart of a method for configuring an HARQ delay according to an embodiment. As shown in FIG. 3, the method for configuring the HARQ delay is applied in a terminal and includes the following steps:

In step S21, a first HARQ feedback delay value is determined.

The first HARQ feedback delay value belongs to a first HARQ feedback delay value set, the first HARQ feedback delay value set is associated with the terminal of the first type and is different from a second HARQ feedback delay value set associated with a terminal of a second type, and the terminal belongs to the terminal of the first type.

By determining a first HARQ feedback delay value for a terminal of a first type, and thereby determining that the first HARQ feedback delay value belongs to a first HARQ feedback delay value set, and with that the first HARQ feedback delay value set is associated with the terminal of the first type, and that the first HARQ feedback delay value set is different from a second HARQ feedback delay value set associated with a terminal of a second type, the present disclosure determines a flexible HARQ feedback delay value for the terminal, which can enhance the performance of HARQ bundling and meet the HARQ feedback delay value requirement when the terminal supports both the HARQ bundling and the HARQ process.

In some embodiments of the present disclosure, the terminal receives first indication information to determine the first HARQ feedback delay value. The network-side device may define, according to a scheduling characteristic of an HARQ process, at least two HARQ feedback delay value sets for the terminal to be used for an HARQ bundling function. For example, for the terminal of the first type, the first HARQ feedback delay value set associated with the terminal of the first type is defined, and for the terminal of the second type, the second HARQ feedback delay value set associated with the terminal of the second type is defined. Further, the first HARQ feedback delay value set defined is different from the second HARQ feedback delay value set associated with the terminal of the second type. The first and second HARQ feedback delay value sets defined may be defined as one HARQ feedback delay value set, then the first HARQ feedback delay value set is a subset or full set of the one HARQ feedback delay value set defined, and the second HARQ feedback delay value set is a subset or full set of the one HARQ feedback delay value set defined. In an embodiment, at least two HARQ feedback delay value sets are defined. For example, if two HARQ feedback delay value sets are defined, one of the HARQ feedback delay value sets is the first HARQ feedback delay value set associated with the terminal of the first type, and the other of the HARQ feedback delay value sets is the second HARQ feedback delay value set associated with the terminal of the second type. When it needs, according to the scheduling characteristic of the HARQ, to indicate one HARQ feedback delay value to be used by the terminal, the type of the terminal may be determined and the HARQ feedback delay value set to be used is notified to the terminal via indication information. In an embodiment, the HARQ feedback delay value set associated with the type of the terminal is further determined according to the determined type of the terminal, so that the HARQ feedback delay value to be used by the terminal is determined according to the HARQ feedback delay value set associated with the type of the terminal, and first indication information may be sent to directly indicate the HARQ feedback delay value to be used by the terminal.

In an embodiment, if the determined type of the terminal is the terminal of the first type, the network-side device determines a first HARQ feedback delay value for the terminal of the first type according to the first HARQ feedback delay value set associated with the terminal of the first type.

In another embodiment, if the determined type of the terminal is the terminal of the first type and there is an HARQ feedback delay value supported by the terminal of the first type in the second HARQ feedback delay value set, the network-side device may also determine the first HARQ feedback delay value for the terminal of the first type according to the second HARQ feedback delay value set.

According to the received first indication information, the terminal of the first type determines the first HARQ feedback delay value based the first HARQ feedback delay value set associated with itself.

In some embodiments of the present disclosure, the first HARQ feedback delay value set includes at least one first HARQ feedback delay value, and the at least one first HARQ feedback delay value does not belong to the second HARQ feedback delay value set. In other words, if at least two HARQ feedback delay value sets are defined, there is at least one HARQ feedback delay value which belongs to the first HARQ feedback delay value set and does not belong to the second HARQ feedback delay value. In an embodiment, there is at least one HARQ feedback delay value which belongs to the second HARQ feedback delay value set and does not belong to the first HARQ feedback delay value.

In an embodiment, the terminal of the first type is a terminal supporting a first number of HARQ processes, and the terminal of the second type is a terminal not supporting the first number of HARQ processes.

In some embodiments of the present disclosure, the network-side device defines at least two HARQ feedback delay value sets according to a scheduling characteristic of the HARQ process for configuring the HARQ bundling function. In an embodiment of the present disclosure, the terminal supporting the first number of HARQ processes is referred to as the terminal of the first type, and the terminal not supporting the first number of HARQ processes is referred to as the terminal of the second type. Among the at least two HARQ feedback delay value sets defined, the first HARQ feedback delay value set is associated with the terminal of the first type, and the second HARQ feedback delay value set is associated with the terminal of the second type. In this case, the number of the first HARQ feedback delay values in the defined first HARQ feedback delay value set may be greater than the number of the second HARQ feedback delay values in the second HARQ feedback delay value set. For example, the defined first HARQ feedback delay value set includes 10 first HARQ feedback delay values having the range of 5 to 15, and the defined second HARQ feedback delay value set may include 8 second HARQ feedback delay values having the range of 4 to 11, which, of course, is illustrative and is not a limitation of the embodiments of the present disclosure.

In an embodiment of the present disclosure, when defining the HARQ feedback delay values in the first and second HARQ feedback delay value sets, the HARQ feedback delay values in the first and second HARQ feedback delay value sets may also be filtered HARQ feedback delay values that may be supported by the terminal.

In some embodiments of the present disclosure, when one HARQ feedback delay value needs to be indicated for the terminal according to the scheduling characteristic of the HARQ process, the network side may first notify the terminal of the HARQ feedback delay value set to be used through indication information. Then, the network side indicates the HARQ feedback delay value in the HARQ feedback delay value set to the terminal via an information field included in a downlink control indicator. For example, if the determined type of terminal is the terminal of the first type, the network side first notifies the terminal of the first type of the HARQ feedback delay value set to be used via the indication information. Then, the network side sends first indication information via the downlink control indicator to notify the terminal of the first type of the HARQ feedback delay value to be used. The first indication information is used to indicate the first HARQ feedback delay value, and the first indication information includes a first information field for indicating the HARQ feedback delay value in the first HARQ feedback delay value set. The first information field includes a bit corresponding to the first HARQ feedback delay value in the HARQ feedback delay value set. The terminal may determine, according to the bit, the first HARQ feedback delay value corresponding to the bit in the notified HARQ feedback delay value set.

The terminal receives the first indication information sent by the network-side device to determine the first HARQ feedback delay value. If the network side also sends indication information for indicating the HARQ feedback delay value set used by the terminal before sending the first indication information, the terminal first receives the indication information for indicating the HARQ feedback delay value set used by the terminal to determine the HARQ feedback delay value set used, and then receives the first indication information to determine the first HARQ feedback delay value.

It may be understood that when defining the relationship between the bit and the HARQ feedback delay value, it is determined that the bit for indicating the HARQ feedback delay value to be used by the terminal is in a fixed one-to-one correspondence with the HARQ feedback delay value. For example, when the information field for indicating the HARQ feedback delay value is 3 bits, the HARQ feedback delay value corresponding to 000 may be 4, the HARQ feedback delay value corresponding to 001 may be 5, and the like. When the information field for indicating the HARQ feedback delay value is 4 bits, the HARQ feedback delay value corresponding to 0000 may be 4, the HARQ feedback delay value corresponding to 0001 may be 5, and the like. Of course, these are only examples and are not to limit the embodiments of the present disclosure. For different HARQ feedback delay value sets, there may be different mapping relationships between the bit value and the HARQ feedback delay value. These mapping relationships may be specified by protocol or may be pre-configured. The terminal may determine the mapping relationship between the bit value and the HARQ feedback delay value inherent in the used HARQ feedback delay value set by determining this HARQ feedback delay value set.

In an embodiment of the present disclosure, the terminal determines, according to the type of the terminal itself, or according to the HARQ feedback delay value set to be used by the terminal indicated by the network side, that the information field indicating the HARQ feedback delay value included in the first indication information received from the network side is 4 bits, and thus determines, according to the bit value indicated by the 4 bits, the HARQ feedback delay value corresponding thereto.

In another embodiment of the present disclosure, if the terminal supports the first number of HARQ processes and supports the HARQ bundling function, the network-side device configures the HARQ bundling function for the terminal by means of RRC signaling or MAC signaling, and may send second indication information in the downlink control indicator to indicate the terminal whether to activate the HARQ bundling function supported by the terminal or not. If the terminal receives the second indication information sent by the network side and determines to activate the bundling function, the terminal determines that the HARQ feedback delay value in the first HARQ feedback delay value set is indicated with the information field of 4 bits included in the received first indication information. In an embodiment, if the terminal receives the second indication information sent by the network side and determines not to activate the bundling function, the terminal determines that the HARQ feedback delay value in the first HARQ feedback delay value set is indicated with the information field of 3 bits included in the received first indication information. The first number of HARQ processes may be 14 HARQ processes.

In some embodiments of the present disclosure, when at least two HARQ feedback delay value sets are defined, the first HARQ feedback delay value set and the second HARQ feedback delay value set defined have the same number of HARQ feedback delay values and different HARQ feedback delay values. Cases of different HARQ feedback delay values include at least one of the followings:

all of the HARQ feedback delay values in the first HARQ feedback delay value set being different from the HARQ feedback delay values in the second HARQ feedback delay value set; or part of the HARQ feedback delay values in the first HARQ feedback delay value set being different from the HARQ feedback delay values in the second HARQ feedback delay value set; or the range of the HARQ feedback delay values in the first HARQ feedback delay set being different from the range of the HARQ feedback delay value in the second HARQ feedback delay set.

For example, the first HARQ feedback delay set includes 8 first HARQ feedback delay values having the range of 4 to 11, and the second HARQ feedback delay set similarly includes 8 second HARQ feedback delay values having the range of 8 to 15. Of course, these are examples only, and are not to limit the embodiments of the present disclosure.

In some embodiments of the present disclosure, the terminal receives third indication information to determine the HARQ feedback delay value set to be used. For example, the terminal receives the third indication information sent by the network-side device, and determines to use the first HARQ feedback delay value set or the second HARQ feedback delay value set according to the third indication information.

In some embodiments of the present disclosure, the first number of HARQ processes in the above embodiments may be 14 HARQ processes.

Based on the same concept, an embodiment of the present disclosure also provides a device for configuring a hybrid automatic repeat request (HARQ) delay.

It may be understood that the device for configuring the HARQ delay provided by embodiments of the present disclosure includes corresponding hardware structures and/or software modules that perform respective functions in order to achieve the above functions. In combination with units and algorithmic steps of the various examples disclosed in embodiments of the present disclosure, the embodiments of the present disclosure may be implemented in the form of hardware or a combination of hardware and computer software. Whether a particular function is performed in the form of hardware or computer software driving hardware depends on the particular application and design constraints of the technical solution. A person skilled in the art may use a different approach for each particular application to implement the described function, but such an implementation should not be considered going beyond the scope of the technical solutions of the embodiments of the present disclosure.

Figure 4:
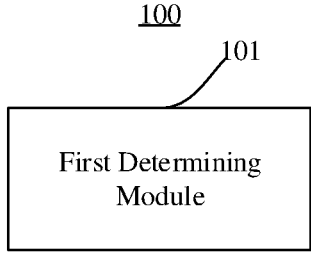
FIG. 4 is a block diagram of a device for configuring an HARQ delay according to an embodiment.

FIG. 4 is a block diagram of a device 100 for configuring an HARQ delay according to an embodiment. As shown in FIG. 4, the device is applied in a network-side device and includes a first determining module 101.

The first determining module 101 is configured to determine a first HARQ feedback delay value for a terminal of a first type.

The first HARQ feedback delay value belongs to a first HARQ feedback delay value set, and the first HARQ feedback delay value set is associated with the terminal of the first type and is different from a second HARQ feedback delay value set associated with a terminal of a second type.

By determining a first HARQ feedback delay value for a terminal of a first type, and thereby determining that the first HARQ feedback delay value belongs to a first HARQ feedback delay value set, and with that the first HARQ feedback delay value set is associated with the terminal of the first type, and that the first HARQ feedback delay value set is different from a second HARQ feedback delay value set associated with a terminal of a second type, the present disclosure determines a flexible HARQ feedback delay value for the terminal, which can enhance the performance of HARQ bundling and meet the HARQ feedback delay value requirement when the terminal supports both the HARQ bundling and the HARQ process.

In some embodiments of the present disclosure, the network-side device defines, according to a scheduling characteristic of an HARQ process, an HARQ feedback delay value set when configuring an HARQ bundling function for a terminal. For example, the network-side device defines, for the terminal of the first type, the first HARQ feedback delay value set associated with the terminal of the first type, and for the terminal of the second type, the second HARQ feedback delay value set associated with the terminal of the second type. Further, the first HARQ feedback delay value set defined is different from the second HARQ feedback delay value set associated with the terminal of the second type. The first and second HARQ feedback delay value sets defined may be defined as one HARQ feedback delay value set, then the first HARQ feedback delay value set is a subset or full set of the one HARQ feedback delay value set defined, and the second HARQ feedback delay value set is a subset or full set of the one HARQ feedback delay value set defined. In an embodiment, at least two HARQ feedback delay value sets are defined. For example, if two HARQ feedback delay value sets are defined, one of the HARQ feedback delay value sets is the first HARQ feedback delay value set associated with the terminal of the first type, and the other of the HARQ feedback delay value sets is the second HARQ feedback delay value set associated with the terminal of the second type. When it needs, according to the scheduling characteristic of the HARQ, to indicate a terminal one HARQ feedback delay value supported, the type of the terminal is determined and the HARQ feedback delay value set supported is notified to the terminal via third indication information. In an embodiment, the HARQ feedback delay value set associated with the type of the terminal is further determined according to the determined type of the terminal, so that the HARQ feedback delay value to be used by the terminal is determined according to the HARQ feedback delay value set associated with the type of the terminal, and first indication information may be sent to directly indicate the HARQ feedback delay value to be used by the terminal.

In an embodiment, the first determining module 101 is further configured so that if the determined type of the terminal is the terminal of the first type, the network-side device determines a first HARQ feedback delay value for the terminal of the first type according to the first HARQ feedback delay value set associated with the terminal of the first type.

In another embodiment, the first determining module 101 is further configured so that if the determined type of the terminal is the terminal of the first type and there is an HARQ feedback delay value supported by the terminal of the first type in the second HARQ feedback delay value set, the network-side device may also determine the first HARQ feedback delay value for the terminal of the first type according to the second HARQ feedback delay value set.

In some embodiments of the present disclosure, the first HARQ feedback delay value set includes at least one first HARQ feedback delay value, and the at least one first HARQ feedback delay value does not belong to the second HARQ feedback delay value set. In other words, if at least two HARQ feedback delay value sets are defined, there is at least one HARQ feedback delay value which belongs to the first HARQ feedback delay value set and does not belong to the second HARQ feedback delay value. In an embodiment, there is at least one HARQ feedback delay value which belongs to the second HARQ feedback delay value set and does not belong to the first HARQ feedback delay value.

In an embodiment, the terminal of the first type is a terminal supporting a first number of HARQ processes, and the terminal of the second type is a terminal not supporting the first number of HARQ processes.

In some embodiments of the present disclosure, the network-side device defines at least two HARQ feedback delay value sets according to a scheduling characteristic of the HARQ process for use when configuring the HARQ bundling function. In an embodiment of the present disclosure, the terminal supporting the first number of HARQ processes is referred to as the terminal of the first type, and the terminal not supporting the first number of HARQ processes is referred to as the terminal of the second type. Among the at least two HARQ feedback delay value sets defined, the first HARQ feedback delay value set is associated with the terminal of the first type, and the second HARQ feedback delay value set is associated with the terminal of the second type. In this case, the number of the first HARQ feedback delay values in the defined first HARQ feedback delay value set may be greater than the number of the second HARQ feedback delay values in the second HARQ feedback delay value set. For example, the defined first HARQ feedback delay value set includes 8 first HARQ feedback delay values having the range of 4 to 11, and the defined second HARQ feedback delay value set may include 10 second HARQ feedback delay values having the range of 5 to 15, which, of course, is illustrative and is not a limitation of the embodiments of the present disclosure.

In some embodiments, when defining the HARQ feedback delay values in the first and second HARQ feedback delay value sets, the HARQ feedback delay values in the first and second HARQ feedback delay value sets may also be filtered HARQ feedback delay values that may be supported by the terminal.

In some embodiments of the present disclosure, when one HARQ feedback delay value needs to be indicated for the terminal according to the scheduling characteristic of the HARQ process, the network side may first notify the terminal of the HARQ feedback delay value set to be used through indication information. Then, the network side indicates to the terminal the HARQ feedback delay value in the HARQ feedback delay value set via an information field included in a downlink control indicator. For example, if the determined type of terminal is the terminal of the first type, the network side first notifies the terminal of the first type of the HARQ feedback delay value set to be used in determining the HARQ feedback delay values by sending third indication information. Then, the network side sends first indication information via the downlink control indicator to notify the terminal of the first type of the HARQ feedback delay value to be used. The first indication information is used to indicate the first HARQ feedback delay value, and the first indication information includes a first information field for indicating the first HARQ feedback delay value in the HARQ feedback delay value set. In an embodiment, the first information field includes a bit corresponding to the first HARQ feedback delay value in the HARQ feedback delay value set. The terminal may determine, according to the bit, the first HARQ feedback delay value corresponding to the bit in the notified HARQ feedback delay value set.

In one way, when the terminal supports the first number of HARQ processes and supports the HARQ bundling function, the network-side device configures the HARQ bundling function for the terminal via high-level signaling. The high-level signaling may be for example radio resource control (RRC) signaling or media access control (MAC) signaling. In this case, the downlink control indicator (DCI) sent to the terminal may or may not include second indication information for activating the HARQ bundling function of the terminal. Regardless the DCI includes or does not include the second indication information for activating the HARQ bundling function of the terminal, the HARQ feedback delay value used by the terminal may be indicated by using an information field of 4 bits.

In another way, when the terminal supports the first number of HARQ processes and supports the HARQ bundling function, the network-side device configures the HARQ bundling function for the terminal by means of RRC signaling or MAC signaling. Second indication information may be included in the downlink control indicator (DCI) to indicate the terminal whether to activate the HARQ bundling function supported by the terminal or not. In an embodiment, if the network-side device determines to active the HARQ bundling function, the second indication information is sent to instruct the terminal to activate the HARQ bundling function. In this case, the first HARQ feedback delay value in the HARQ feedback delay value set used by the terminal may be indicated with 4 bits. In another embodiment, if the network-side device determines not to active the HARQ bundling function, the second indication information is not carried in the DCI, which indicates not to instruct the terminal to active the HARQ bundling function. In this case, 3 bits may be used to indicate the HARQ feedback delay value in the first HARQ feedback delay value set.

It may be understood that when defining the relationship between the bit and the HARQ feedback delay value, it is determined that the bit for indicating the HARQ feedback delay value to be used by the terminal is in a fixed one-to-one correspondence with the HARQ feedback delay value. For example, when the information field for indicating the HARQ feedback delay value is 3 bits, the HARQ feedback delay value corresponding to 000 may be 4, the HARQ feedback delay value corresponding to 001 may be 5, and the like. When the information field for indicating the HARQ feedback delay value is 4 bits, the HARQ feedback delay value corresponding to 0000 may be 4, the HARQ feedback delay value corresponding to 0001 may be 5, and the like. Of course, these are only examples and are not to limit the embodiments of the present disclosure. For different HARQ feedback delay value sets, there may be different mapping relationships between the bit value and the HARQ feedback delay value. These mapping relationships may be specified by protocol or may be pre-configured. The terminal may determine the mapping relationship between the bit value and the HARQ feedback delay value inherent in the used HARQ feedback delay value set by determining this HARQ feedback delay value set.

In some embodiments of the present disclosure, when the network-side device defines at least two HARQ feedback delay value sets, the first HARQ feedback delay value set and the second HARQ feedback delay value set defined have the same number of HARQ feedback delay values and different HARQ feedback delay values. Cases of different HARQ feedback delay values include at least one of the followings:

all of the HARQ feedback delay values in the first HARQ feedback delay value set being different from the HARQ feedback delay values in the second HARQ feedback delay value set; or part of the HARQ feedback delay values in the first HARQ feedback delay value set being different from the HARQ feedback delay values in the second HARQ feedback delay value set; or the range of the HARQ feedback delay values in the first HARQ feedback delay set being different from the range of the HARQ feedback delay value in the second HARQ feedback delay set.

For example, the first HARQ feedback delay set includes 8 first HARQ feedback delay values having the range of 4 to 11, and the second HARQ feedback delay set similarly includes 8 second HARQ feedback delay values having the range of 8 to 15. Of course, these are examples only, and are not to limit the embodiments of the present disclosure.

In some embodiments of the present disclosure, the network-side device notifies the terminal of the HARQ feedback delay value set to be used by sending third indication information. For example, the network-side device defines at least two HARQ feedback delay value sets and sends the third indication information to the terminal of the first type. The third indication information is used to indicate the terminal of the first type to use the first HARQ feedback delay value set or the second HARQ feedback delay value set. In another embodiment, since in the at least two HARQ feedback delay sets defined, the first HARQ feedback delay set is associated with the terminal of the first type and/or the second HARQ feedback delay set is associated with the terminal of the second type, when a target terminal is determined to be the terminal of the first type, it may directly indicate the HARQ feedback delay to be used to the terminal according to the first HARQ feedback delay set, and when the target terminal is determined to be the terminal of the second type, it may directly indicate the HARQ feedback delay value to be used to the terminal according to the second HARQ feedback delay value set.

In some embodiments of the present disclosure, the first number of HARQ processes involved in the above embodiments may be 14 HARQ processes. The first HARQ feedback delay value set may be a feedback delay value set supporting 14 HARQ processes.

In the following embodiments of the present disclosure, it will illustrate an example where the network defines at least two HARQ feedback delay value sets when configuring the HARQ bundling function for the terminal, in which the terminal supporting 14 HARQ processes is the terminal of the first type and the terminal not supporting 14 HARQ processes is the terminal of the second type.

In some embodiments of the present disclosure, the network-side device defines at least two HARQ feedback delay value sets when configuring HARQ bundling, in which the first HARQ feedback delay value set is associated with the terminal of the first type, and the second HARQ feedback delay value set is associated with the terminal of the second type. Further, the first HARQ feedback delay set is different from the second HARQ feedback delay set associated with the terminal of the second type.

When the network-side device needs to indicate the HARQ feedback delay value for the terminal according to the scheduling characteristic of HARQ, the network-side device first determines the type of the terminal, and determines the HARQ feedback delay value set to used by the terminal according to the type of the terminal.

In an embodiment of the present disclosure, for example, the determined type of terminal is the terminal of the first type. In an embodiment, the first HARQ feedback delay value is determined for the terminal of the first type according to the first HARQ feedback delay value set associated with the terminal of the first type. In another embodiment, if there is a HARQ feedback delay value supported by the terminal of the first type in the second HARQ feedback delay set, the network-side device may also determine the first HARQ feedback delay value for the terminal of the first type according to the second HARQ feedback delay set, in this case, third indication information needs to be sent to indicate the terminal to use the second HARQ feedback delay set.

It may be understood that the first HARQ feedback delay set includes at least one first HARQ feedback delay value and the at least one first HARQ feedback delay value does not belong to the second HARQ feedback delay set. In other words, if at least two HARQ feedback delay value sets are defined, there is at least one HARQ feedback delay value that belongs to the first HARQ feedback delay value set and does not belong to the second HARQ feedback delay value. In an embodiment, there is at least one HARQ feedback delay value that belongs to the second HARQ feedback delay value set and does not belong to the first HARQ feedback delay value. In an embodiment, the number of the first HARQ feedback delay values in the first HARQ feedback delay value set defined may be greater than the number of the second HARQ feedback time delay values in the second HARQ feedback delay value set. For example, the defined first HARQ feedback delay value set includes 10 first HARQ feedback delay values having the range of 5 to 15, and the defined second HARQ feedback delay value set may include 8 second HARQ feedback delay values having the range of 4 to 11, which, of course, is illustrative and is not a limitation of the embodiments of the present disclosure.

In an embodiment of the present disclosure, when defining the HARQ feedback delay values in the first and second HARQ feedback delay value sets, the HARQ feedback delay values in the first and second HARQ feedback delay value sets may also be filtered HARQ feedback delay values that may be supported by the terminal.

In an embodiment of the present disclosure, when the network-side device determines that the terminal supports 14 HARQ processes and supports the HARQ bundling function, and the network-side device configures the HARQ bundling function for the terminal via RRC signaling or MAC signaling, the network-side device may indicate the terminal to activate the HARQ bundling function via a downlink control indicator, and indicate the HARQ feedback delay value to be used for the terminal by sending the downlink control indicator. In an embodiment, the downlink control indicator may include an information field for indicating the HARQ feedback delay value to be used by the terminal, and the number of bits included in the information field may be determined based on any of the following:

determining to use the information field of 4 bits in the downlink control indicator to indicate the HARQ feedback delay value used by the terminal; or determining to activate the HARQ bundling function of the terminal, and then in response to determining to activate the HARQ bundling function, indicating, with 4 bits, the HARQ feedback delay value in the first HARQ feedback delay value set; and in response to determining not to activate the HARQ bundling function of, indicating, with 3 bits, the HARQ feedback delay value in the first HARQ feedback delay value set.

It may be understood that when defining the relationship between the bit and the HARQ feedback delay value, it is determined that the bit for indicating the HARQ feedback delay value to be used by the terminal is in a fixed one-to-one correspondence with the HARQ feedback delay value. For example, when the information field for indicating the HARQ feedback delay value is 3 bits, the HARQ feedback delay value corresponding to 000 may be 4, the HARQ feedback delay value corresponding to 001 may be 5, and the like. When the information field for indicating the HARQ feedback delay value is 4 bits, the HARQ feedback delay value corresponding to 0000 may be 4, the HARQ feedback delay value corresponding to 0001 may be 5, and the like. Of course, these are only examples and are not to limit the embodiments of the present disclosure. For different HARQ feedback delay value sets, there may be different mapping relationships between the bit value and the HARQ feedback delay value. These mapping relationships may be specified by protocol or may be pre-configured. The terminal may determine the mapping relationship between the bit value and the HARQ feedback delay value inherent in the used HARQ feedback delay value set by determining this HARQ feedback delay value set.

When the network-side device defines at least two HARQ feedback delay value sets, the first HARQ feedback delay value set and the second HARQ feedback delay value set defined have the same number of HARQ feedback delay values and different HARQ feedback delay values. Cases of the different HARQ feedback delay values include at least one of the followings:

all of the HARQ feedback delay values in the first HARQ feedback delay value set being different from the HARQ feedback delay values in the second HARQ feedback delay value set; or part of the HARQ feedback delay values in the first HARQ feedback delay value set being different from the HARQ feedback delay values in the second HARQ feedback delay value set; or the range of the HARQ feedback delay values in the first HARQ feedback delay set being different from the range of the HARQ feedback delay value in the second HARQ feedback delay set.

For example, the first HARQ feedback delay set includes 8 first HARQ feedback delay values having the range of 4 to 11, and the second HARQ feedback delay set similarly includes 8 second HARQ feedback delay values having the range of 8 to 15. Of course, these are examples only, and are not to limit the embodiments of the present disclosure.

Figure 5:
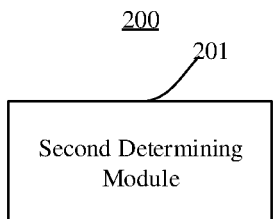
FIG. 5 is a block diagram of another device for configuring an HARQ delay according to an embodiment.

FIG. 5 is a block diagram of a device 200 for configuring an HARQ delay according to an embodiment. As shown in FIG. 5, the device is applied in a terminal and includes a second determining module 201.

The second determining module 201 is configured to determine a first HARQ feedback delay value.

The first HARQ feedback delay value belongs to a first HARQ feedback delay value set, the first HARQ feedback delay value set is associated with the terminal of the first type and is different from a second HARQ feedback delay value set associated with a terminal of a second type, and the terminal belongs to the terminal of the first type.

By determining a first HARQ feedback delay value for a terminal of a first type, and thereby determining that the first HARQ feedback delay value belongs to a first HARQ feedback delay value set, and with that the first HARQ feedback delay value set is associated with the terminal of the first type, and that the first HARQ feedback delay value set is different from a second HARQ feedback delay value set associated with a terminal of a second type, the present disclosure determines a flexible HARQ feedback delay value for the terminal, which can enhance the performance of HARQ bundling and meet the HARQ feedback delay value requirement when the terminal supports both the HARQ bundling and the HARQ process.

In some embodiments of the present disclosure, the second determining module 201 is configured so that the terminal receives first indication information to determine the first HARQ feedback delay value. The network-side device may define, according to a scheduling characteristic of an HARQ process, at least two HARQ feedback delay value sets for the terminal to be used for an HARQ bundling function. For example, for the terminal of the first type, the first HARQ feedback delay value set associated with the terminal of the first type is defined, and for the terminal of the second type, the second HARQ feedback delay value set associated with the terminal of the second type is defined. Further, the first HARQ feedback delay value set defined is different from the second HARQ feedback delay value set associated with the terminal of the second type. The first and second HARQ feedback delay value sets defined may be defined as one HARQ feedback delay value set, then the first HARQ feedback delay value set is a subset or full set of the one HARQ feedback delay value set defined, and the second HARQ feedback delay value set is a subset or full set of the one HARQ feedback delay value set defined. In an embodiment, at least two HARQ feedback delay value sets are defined. For example, if two HARQ feedback delay value sets are defined, one of the HARQ feedback delay value sets is the first HARQ feedback delay value set associated with the terminal of the first type, and the other of the HARQ feedback delay value sets is the second HARQ feedback delay value set associated with the terminal of the second type. When it needs, according to the scheduling characteristic of the HARQ, to indicate one HARQ feedback delay value to be used by the terminal, the type of the terminal may be determined and the HARQ feedback delay value set to be used is notified to the terminal via indication information. In an embodiment, the HARQ feedback delay value set associated with the type of the terminal is further determined according to the determined type of the terminal, so that the HARQ feedback delay value to be used by the terminal is determined according to the HARQ feedback delay value set associated with the type of the terminal, and first indication information may be sent to directly indicate the HARQ feedback delay value to be used by the terminal.

In an embodiment, the second determining module 201 is further configured so that if the determined type of the terminal is the terminal of the first type, the network-side device determines a first HARQ feedback delay value for the terminal of the first type according to the first HARQ feedback delay value set associated with the terminal of the first type.

In another embodiment, the second determining module 201 is further configured so that if the determined type of the terminal is the terminal of the first type and there is an HARQ feedback delay value supported by the terminal of the first type in the second HARQ feedback delay value set, the network-side device may also determine the first HARQ feedback delay value for the terminal of the first type according to the second HARQ feedback delay value set.

According to the received first indication information, the terminal of the first type determines the first HARQ feedback delay value based the first HARQ feedback delay value set associated with itself.

In some embodiments of the present disclosure, the first HARQ feedback delay value set includes at least one first HARQ feedback delay value, and the at least one first HARQ feedback delay value does not belong to the second HARQ feedback delay value set. In other words, if at least two HARQ feedback delay value sets are defined, there is at least one HARQ feedback delay value which belongs to the first HARQ feedback delay value set and does not belong to the second HARQ feedback delay value. In an embodiment, there is at least one HARQ feedback delay value which belongs to the second HARQ feedback delay value set and does not belong to the first HARQ feedback delay value.

In an embodiment, the terminal of the first type is a terminal supporting a first number of HARQ processes, and the terminal of the second type is a terminal not supporting the first number of HARQ processes.

In some embodiments of the present disclosure, the network-side device defines at least two HARQ feedback delay value sets according to a scheduling characteristic of the HARQ process for configuring the HARQ bundling function. In an embodiment of the present disclosure, the terminal supporting the first number of HARQ processes is referred to as the terminal of the first type, and the terminal not supporting the first number of HARQ processes is referred to as the terminal of the second type. Among the at least two HARQ feedback delay value sets defined, the first HARQ feedback delay value set is associated with the terminal of the first type, and the second HARQ feedback delay value set is associated with the terminal of the second type. In this case, the number of the first HARQ feedback delay values in the defined first HARQ feedback delay value set may be greater than the number of the second HARQ feedback delay values in the second HARQ feedback delay value set. For example, the defined first HARQ feedback delay value set includes 10 first HARQ feedback delay values having the range of 5 to 15, and the defined second HARQ feedback delay value set may include 8 second HARQ feedback delay values having the range of 4 to 11, which, of course, is illustrative and is not a limitation of the embodiments of the present disclosure.

In an embodiment of the present disclosure, when defining the HARQ feedback delay values in the first and second HARQ feedback delay value sets, the HARQ feedback delay values in the first and second HARQ feedback delay value sets may also be filtered HARQ feedback delay values that may be supported by the terminal.

In some embodiments of the present disclosure, when one HARQ feedback delay value needs to be indicated for the terminal according to the scheduling characteristic of the HARQ process, the network side may first notify the terminal of the HARQ feedback delay value set to be used through indication information. Then, the network side indicates the HARQ feedback delay value in the HARQ feedback delay value set to the terminal via an information field included in a downlink control indicator. For example, if the determined type of terminal is the terminal of the first type, the network side first notifies the terminal of the first type of the HARQ feedback delay value set to be used via the indication information. Then, the network side sends first indication information via the downlink control indicator to notify the terminal of the first type of the HARQ feedback delay value to be used. The first indication information is used to indicate the first HARQ feedback delay value, and the first indication information includes a first information field for indicating the HARQ feedback delay value in the first HARQ feedback delay value set. The first information field includes a bit corresponding to the first HARQ feedback delay value in the HARQ feedback delay value set. The terminal may determine, according to the bit, the first HARQ feedback delay value corresponding to the bit in the notified HARQ feedback delay value set.

The terminal receives the first indication information sent by the network-side device to determine the first HARQ feedback delay value. If the network side also sends indication information for indicating the HARQ feedback delay value set used by the terminal before sending the first indication information, the terminal first receives the indication information for indicating the HARQ feedback delay value set used by the terminal to determine the HARQ feedback delay value set used, and then receives the first indication information to determine the first HARQ feedback delay value.

It may be understood that when defining the relationship between the bit and the HARQ feedback delay value, it is determined that the bit for indicating the HARQ feedback delay value to be used by the terminal is in a fixed one-to-one correspondence with the HARQ feedback delay value. For example, when the information field for indicating the HARQ feedback delay value is 3 bits, the HARQ feedback delay value corresponding to 000 may be 4, the HARQ feedback delay value corresponding to 001 may be 5, and the like. When the information field for indicating the HARQ feedback delay value is 4 bits, the HARQ feedback delay value corresponding to 0000 may be 4, the HARQ feedback delay value corresponding to 0001 may be 5, and the like. Of course, these are only examples and are not to limit the embodiments of the present disclosure. For different HARQ feedback delay value sets, there may be different mapping relationships between the bit value and the HARQ feedback delay value. These mapping relationships may be specified by protocol or may be pre-configured. The terminal may determine the mapping relationship between the bit value and the HARQ feedback delay value inherent in the used HARQ feedback delay value set by determining this HARQ feedback delay value set.

In an embodiment of the present disclosure, the second determining module 201 is further configured so that the terminal determines, according to the type of the terminal itself, or according to the HARQ feedback delay value set to be used by the terminal indicated by the network side, that the information field indicating the HARQ feedback delay value included in the first indication information received from the network side is 4 bits, and thus determines, according to the bit value indicated by the 4 bits, the HARQ feedback delay value corresponding thereto.

In another embodiment of the present disclosure, if the terminal supports the first number of HARQ processes and supports the HARQ bundling function, the network-side device configures the HARQ bundling function for the terminal by means of RRC signaling or MAC signaling, and may send second indication information in the downlink control indicator to indicate the terminal whether to activate the HARQ bundling function supported by the terminal or not. If the terminal receives the second indication information sent by the network side and determines to activate the bundling function, the terminal determines that the HARQ feedback delay value in the first HARQ feedback delay value set is indicated with the information field of 4 bits included in the received first indication information. In an embodiment, if the terminal receives the second indication information sent by the network side and determines not to activate the bundling function, the terminal determines that the HARQ feedback delay value in the first HARQ feedback delay value set is indicated with the information field of 3 bits included in the received first indication information. The first number of HARQ processes may be 14 HARQ processes.

In some embodiments of the present disclosure, when at least two HARQ feedback delay value sets are defined, the first HARQ feedback delay value set and the second HARQ feedback delay value set defined have the same number of HARQ feedback delay values and different HARQ feedback delay values. Cases of different HARQ feedback delay values include at least one of the followings:

all of the HARQ feedback delay values in the first HARQ feedback delay value set being different from the HARQ feedback delay values in the second HARQ feedback delay value set; or part of the HARQ feedback delay values in the first HARQ feedback delay value set being different from the HARQ feedback delay values in the second HARQ feedback delay value set; or the range of the HARQ feedback delay values in the first HARQ feedback delay set being different from the range of the HARQ feedback delay value in the second HARQ feedback delay set.

For example, the first HARQ feedback delay set includes 8 first HARQ feedback delay values having the range of 4 to 11, and the second HARQ feedback delay set similarly includes 8 second HARQ feedback delay values having the range of 8 to 15. Of course, these are examples only, and are not to limit the embodiments of the present disclosure.

In some embodiments of the present disclosure, the second determining module 201 is further configured so that the terminal receives third indication information to determine the HARQ feedback delay value set to be used. For example, the terminal receives the third indication information sent by the network-side device, and determines to use the first HARQ feedback delay value set or the second HARQ feedback delay value set according to the third indication information.

In some embodiments of the present disclosure, the first number of HARQ processes in the above embodiments may be 14 HARQ processes.

With regard to the device in the above-mentioned embodiment, the specific manner in which the respective modules perform their operations has been described in detail in the embodiment concerning the method and will not be described in detail here.

Figure 6:
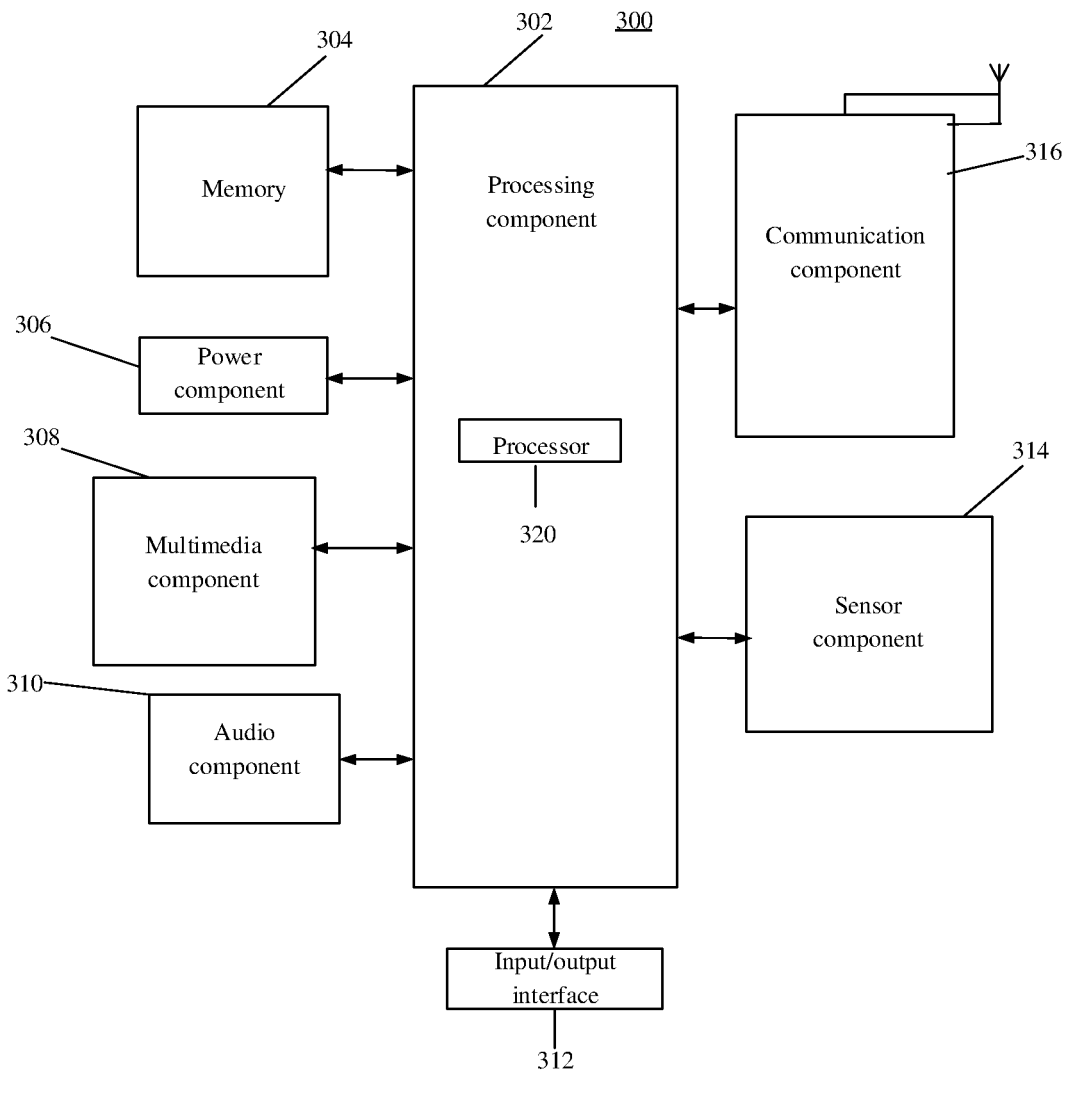
FIG. 6 is a block diagram of further another device for configuring an HARQ delay according to an embodiment.

FIG. 6 is a block diagram of a device 300 for configuring a HARQ delay according to an embodiment. For example, the device 300 may be a mobile phone, a computer, a digital broadcasting terminal, a messaging device, a game console, a tablet device, a medical device, a fitness device, a personal digital assistant, or the like.

Referring to FIG. 6, the device 300 may include one or more of a processing component 302, a memory 304, a power component 306, a multimedia component 308, an audio component 310, an input/output (I/O) interface 312, a sensor component 314, and a communication component 316.

The processing component 302 generally controls the overall operations of the device 300, such as operations associated with display, telephone calls, data communications, camera operations, and recording operations. The processing component 302 may include one or more processors 320 to execute instructions to complete all or part of the steps of the foregoing method. In addition, the processing component 302 may include one or more modules to facilitate interaction between the processing component 302 and other components. For example, the processing component 302 may include a multimedia module to facilitate the interaction between the multimedia component 308 and the processing component 302.

The memory 304 is configured to store various types of data to support the operation at the device 300. Examples of these data include instructions for any application or method operating on the device 300, contact data, phone book data, messages, pictures, videos and the like. The memory 304 may be implemented by any type of volatile or non-volatile storage device or a combination thereof, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power component 306 provides power to various components of the device 300. The power component 306 may include a power management system, one or more power supplies, and other components associated with generating, managing, and distributing power for the device 300.

The multimedia component 308 includes a screen that provides an output interface between the device 300 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, sliding, and gestures on the touch panel. The touch sensor may not only sense the boundary of the touch or slide action, but also detect the duration and pressure related to the touch or slide operation. In some embodiments, the multimedia component 308 includes a front camera and/or a rear camera. When the device 300 is in an operation mode, such as a shooting mode or a video mode, the front camera and/or the rear camera can receive external multimedia data. Each front camera and rear camera may be a fixed optical lens system or have focal length and optical zoom capabilities.

The audio component 310 is configured to output and/or input audio signals. For example, the audio component 310 includes a microphone (MIC), and when the device 300 is in an operation mode, such as a call mode, a recording mode, and a voice recognition mode, the microphone is configured to receive an external audio signal. The received audio signal can be further stored in the memory 304 or sent via the communication component 316. In some embodiments, the audio component 310 further includes a speaker for outputting audio signals.

The I/O interface 312 provides an interface between the processing component 302 and a peripheral interface module. The above-mentioned peripheral interface module may be a keyboard, a click wheel, a button, and the like. These buttons may include but are not limited to home button, volume button, start button, and lock button.

The sensor component 314 includes one or more sensors for providing the terminal 300 with various aspects of state evaluation. For example, the sensor component 314 can detect the on/off status of the device 300 and the relative positioning of components. For example, the component is a display and keypad of the device 300. The sensor component 314 can also detect the position change of the device 300 or a component of the device 300, the presence or absence of contact between the user and the device 300, the orientation or acceleration/deceleration of the device 300, and the temperature change of the device 300. The sensor component 314 may include a proximity sensor configured to detect the presence of nearby objects when there is no physical contact. The sensor component 314 may also include a light sensor, such as a CMOS or CCD image sensor, for use in imaging applications. In some embodiments, the sensor component 314 may also include an acceleration sensor, a gyroscope sensor, a magnetic sensor, a pressure sensor, or a temperature sensor.

The communication component 316 is configured to facilitate wired or wireless communication between the device 300 and other devices. The device 300 can access a wireless network based on a communication standard, such as WiFi, 2G, 3G, 4G or 5G, or a combination thereof. In an embodiment, the communication component 316 receives a broadcast signal or broadcast related information from an external broadcast management system via a broadcast channel. In an embodiment, the communication component 316 further includes a near field communication (NFC) module to facilitate short-range communication. For example, the NFC module can be implemented based on radio frequency identification (RFID) technology, infrared data association n (IrDA) technology, ultra-wideband (UWB) technology, Bluetooth (BT) technology and other technologies.

In an embodiment, the device 300 may be implemented by one or more of application specific integrated circuit (ASIC), digital signal processor (DSP), digital signal processing device (DSPD), programmable logic devices (PLD), field programmable gate array (FPGA), controller, microcontroller, microprocessor, or other electronic components, to perform the above-mentioned methods.

An embodiment also provides a non-transitory computer-readable storage medium including instructions, such as the memory 304 including instructions, and the instructions may be executed by the processor 320 of the device 300 to complete the foregoing method. For example, the non-transitory computer-readable storage medium may be ROM, random access memory (RAM), CD-ROM, magnetic tape, floppy disk, optical data storage device and the like.

Figure 7:
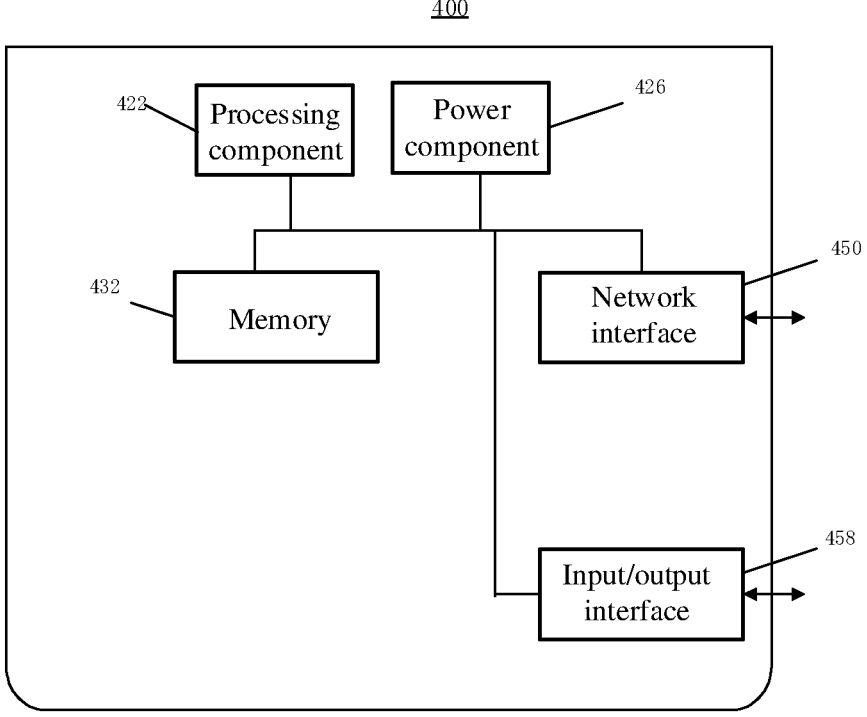
FIG. 7 is a block diagram of yet another device for configuring an HARQ delay according to an embodiment.

FIG. 7 is a block diagram of a device 400 for configuring a HARQ delay according to an embodiment. For example, the device 400 may be provided as a network-side device such as base station, server and network node. Referring to FIG. 7, the device 400 includes a processing component 422 which further includes one or more processors, and a memory resource which is represented by a memory 432 and is configured for storing instructions such as application programs executable by the processing component 422. The application program stored in the memory 432 may include one or more modules each corresponding to a set of instructions. Furthermore, the processing component 422 is configured to execute instructions to perform the method for configuring the HARQ delay.

The device 400 may also include a power component 426 configured to perform power management of the device 400, a wired or wireless network interface 450 configured to connect the device 400 to a network, and an input/output (I/O) interface 458. The device 400 may operate based on an operating system stored in memory 432, such as Windows Server™, Mac OS X™, Unix™, Linux™, Free BSD™ or the like.

It may be further understood that the term "plurality" in the present disclosure means two or more, and other quantifiers are similar. The term "and/or", describing the association of associated objects, indicates that three relationships can exist, for example, A and/or B can indicate the presence of A alone, A and B together, and B alone. The character "/" generally indicates an "or" relationship between the preceding and following associated objects. The singular forms "a", "said" and "the" are also intended to include plural forms, unless the context clearly indicates otherwise.

It may be further understood that the terms "first", "second" and the like are used to describe a variety of information, but that such information should not be limited to these terms. These terms are only used to distinguish information of the same type from one another and do not indicate a particular order or level of importance. In fact, the expressions "first" and "second" may be used interchangeably. For example, without departing from the scope of the present disclosure, first information may also be referred to as second information, and similarly, second information may also be referred to as first information.

It may be further understood that although the operations are depicted in the accompanying drawings in a particular order in embodiments of the present disclosure, this should not be construed as requiring that the operations be performed in the particular order shown or in serial order, or that all of the operations shown be performed to obtain the desired results. Multitasking and parallel processing may be advantageous in particular environments.

A person skilled in the art may easily conceive of other embodiments of the present disclosure upon consideration of the specification and practice of the invention disclosed herein. The present disclosure is intended to cover any variations, uses, or adaptations of the present disclosure that follow the general principles of the present disclosure and include the common general knowledge or conventional technical means in the technical field not disclosed by the present disclosure. The specification and embodiments are to be regarded as exemplary only, with the true scope and spirit of the present disclosure being indicated by the following claims.

It is to be understood that the present disclosure is not limited to the precise structures described above and illustrated in the accompanying drawings, and that various modifications and changes may be made without departing from the scope thereof. The scope of the present disclosure is limited only by the appended claims.

What is claimed is:

1. A method for configuring a hybrid automatic repeat request (HARQ) delay, wherein the method is applied to a network device and comprises:

determining a first HARQ feedback delay value for a terminal of a first type, wherein the first HARQ feedback delay value belongs to a first HARQ feedback delay value set, and the first HARQ feedback delay value set is associated with the terminal of the first type and is different from a second HARQ feedback delay value set associated with a terminal of a second type;

wherein the first HARQ feedback delay value set comprises at least one first HARQ feedback delay value, and the at least one first HARQ feedback delay value does not belong to the second HARQ feedback delay value set, wherein the terminal of the first type is a terminal supporting a first number of HARQ processes, and the terminal of the second type is a terminal not supporting the first number of HARQ processes, wherein a number of HARQ feedback delay values in the first HARQ feedback delay value set is greater than a number of HARQ feedback delay values in the second HARQ feedback delay value set, and wherein the first number of HARQ processes is 14 HARQ processes;

wherein the method further comprises:

sending first indication information for indicating the first HARQ feedback delay value, wherein the first indication information comprises a first information field, and the first information field comprises a bit for indicating a HARQ feedback delay value in the first HARQ feedback delay value set, sending second indication information for indicating whether to activate a HARQ bundling function for the terminal of the first type;

in response to determining to activate the HARQ bundling function, indicating, with 4 bits, the HARQ feedback delay value in the first HARQ feedback delay value set; and in response to determining not to activate the HARQ bundling function, indicating, with 3 bits, the HARQ feedback delay value in the first HARQ feedback delay value set, wherein sending the second indication information for indicating whether to activate the HARQ bundling function for the terminal of the first type comprises:

sending a downlink control indicator (DCI), wherein the method further comprises:

determining to activate the HARQ bundling function by carrying the second indication information in the DCI; and determining to not activate the HARQ bundling function by not carrying the second indication information in the DCI.

2. The method according to claim 1, wherein the first information field comprises 4 bits for indicating the HARQ feedback delay value in the first HARQ feedback delay value set.

3. A method for configuring a hybrid automatic repeat request (HARQ) delay, wherein the method is applied to a terminal of a first type and comprises:

determining a first HARQ feedback delay value, wherein the first HARQ feedback delay value belongs to a first HARQ feedback delay value set, and the first HARQ feedback delay value set is associated with the terminal of the first type and is different from a second HARQ feedback delay value set associated with a terminal of a second type;

wherein the first HARQ feedback delay value set comprises at least one first HARQ feedback delay value, and the at least one first HARQ feedback delay value does not belong to the second HARQ feedback delay value set, wherein the terminal of the first type is a terminal supporting a first number of HARQ processes, and the terminal of the second type is a terminal not supporting the first number of HARQ processes, wherein a number of HARQ feedback delay values in the first HARQ feedback delay value set is greater than a number of HARQ feedback delay values in the second HARQ feedback delay value set, and wherein the first number of HARQ processes is 14 HARQ processes;

wherein the method further comprises:

receiving first indication information for indicating the first HARQ feedback delay value, wherein the first indication information comprises a first information field, and the first information field comprises a bit for indicating a HARQ feedback delay value in the first HARQ feedback delay value set, receiving second indication information for indicating whether to activate a HARQ bundling function for the terminal of the first type;

in response to that the second indication information indicates to activate the HARQ bundling function, determining that the HARQ feedback delay value in the first HARQ feedback delay value set is indicated with 4 bits; and in response to that the second indication information indicates not to activate the HARQ bundling function, determining that the HARQ feedback delay value in the first HARQ feedback delay value set is indicated with 3 bits, wherein receiving the second indication information for indicating whether to activate a HARQ bundling function for the terminal of the first type comprises:

receiving a downlink control indicator (DCI), wherein the method further comprises:

determining to activate the HARQ bundling function by determining that the DCI carries the second indication information; and determining to not activate the HARQ bundling function by determining that the DCI does not carry the second indication information.

4. The method according to claim 3, wherein the first information field comprises 4 bits for indicating the HARQ feedback delay value in the first HARQ feedback delay value set.

5. A terminal, comprising:

a processor; and a memory, storing an executable instruction by the processor, wherein the processor is configured to perform the method according to claim 3.

6. A network device, comprising:

a processor; and a memory, storing an executable instruction by the processor, wherein the processor is configured to:

determine a first hybrid automatic repeat request (HARQ) feedback delay value for a terminal of a first type, wherein the first HARQ feedback delay value belongs to a first HARQ feedback delay value set, and the first HARQ feedback delay value set is associated with the terminal of the first type and is different from a second HARQ feedback delay value set associated with a terminal of a second type;

wherein the first HARQ feedback delay value set comprises at least one first HARQ feedback delay value, and the at least one first HARQ feedback delay value does not belong to the second HARQ feedback delay value set, wherein the terminal of the first type is a terminal supporting a first number of HARQ processes, and the terminal of the second type is a terminal not supporting the first number of HARQ processes, wherein a number of HARQ feedback delay values in the first HARQ feedback delay value set is greater than a number of HARQ feedback delay values in the second HARQ feedback delay value set, wherein the first number of HARQ processes is 14 HARQ processes;

wherein the processor is further configured to:

send first indication information for indicating the first HARQ feedback delay value, wherein the first indication information comprises a first information field, and the first information field comprises a bit for indicating a HARQ feedback delay value in the first HARQ feedback delay value set;

send second indication information for indicating whether to activate a HARQ bundling function for the terminal of the first type;

in response to determining to activate the HARQ bundling function, indicate, with 4 bits, the HARQ feedback delay value in the first HARQ feedback delay value set; and in response to determining not to activate the HARQ bundling function, indicate, with 3 bits, the HARQ feedback delay value in the first HARQ feedback delay value set, wherein sending the second indication information for indicating whether to activate the HARQ bundling function for the terminal of the first type comprises:

sending a downlink control indicator (DCI), wherein the processor is further configured to:

determine to activate the HARQ bundling function by carrying the second indication information in the DCI; and determine to not activate the HARQ bundling function by not carrying the second indication information in the DCI.

* * * * *